United States Patent Office 3,772,359
Patented Nov. 13, 1973

3,772,359
POLYAMIDE-CONTAINING MANNICH REACTION PRODUCTS AS LUBRICANT ADDITIVES
Roland T. Schlobohm, Bethalto, Ill., and Herbert D. Millay, Dunwoody, Ga., assignors to Shell Oil Company, New York, N.Y.
No Drawing. Continuation-in-part of abandoned application Ser. No. 635,636, Mar. 3, 1967, which is a division of application Ser. No. 472,701, July 16, 1965, now Patent No. 3,326,801, dated June 20, 1967. This application Oct. 22, 1969, Ser. No. 868,585
Int. Cl. C09f 7/00
U.S. Cl. 260—404.5
2 Claims

ABSTRACT OF THE DISCLOSURE

Reaction products of (1) a polyamide of an iso-fatty acid and a polyalkylene polyamine and (2) a mixture of an aldehyde and an alkyl hydroxy aromatic compound, are useful as lubricant additives.

---

This application is a continuation-in-part of application Ser. No. 635,636, filed Mar. 3, 1967, and now abandoned, which is a division of application Ser. No. 472,701, filed July 16, 1965, which issued on June 20, 1967, as U.S. Pat. 3,326,801.

This inventioin relates to novel lubricating oil compositions. More particularly, the invention is concerned with new, novel and superior lubricating oil compositions for use in internal combustion engines.

The use of ashless polymeric compounds as detergents in lubricating oil compositions is well known in the art. Polymers of this type are generally high molecular weight nitrogen-containing polymers such as copolymers of vinyl pyridine or vinyl pyrrolidone and long-chain alkyl methacrylates, or mono(polyolefin) succinimides derived from mono(polyolefin) succinic anhydride and polyalkylene polyamines. Although polymers and copolymers of this type are excellent detergent-dispersant oil additives, they lack corrosion and wear inhibiting properties and therefore require the presence of fortifying agents capable of inhibiting corrosion and wear.

The use of fortifiers in conjunction with such detergents, however, presents new problems such as interaction of the additive mixture or interference with each other's functions resulting in general ineffectiveness of such compounded lubricants, particularly when they are used in engines operating under "stop-and-go" conditions or severe temperature and pressure conditions. Where some such additive combinations in lubricants have been found to be successful, cost increase, short lubricant life and their restrictive use to special types of engines has made use of such lubricants unattractive.

It has now been discovered that an excellent multi-functional lubricating oil composition can be made useful in various types of engines such as 4-stroke and 2-stroke engines and particularly for use in the latter type engines by incorporating in a lubricating oil base a small amount of from 0.1 to about 20%, preferably from 2–8% of an oil-soluble reaction product of (1) a polyamide of a polyalkylene polyamine and an iso-fatty acid or mixture of an iso-fatty acid and a straight-chain fatty acid with (2) a mixture of condensation product of an alkyl hydroxyaromatic compound and low molecular weight aldehyde.

The polyamide compound (1) can be prepared by reacting a polyalkylene polyamine as hereinafter defined with from 1 to 4 moles of an iso-fatty acid or with a mixture of iso-fatty acids and straight chain acids at between 100 and 250° C., preferably 150 and 200° C., for about 5–24 hours in an enclosed vessel under atmospheric conditions.

Polyamide compounds suitable for preparation of the condensation products of the invention must have at least one free basic nitrogen atom, i.e. a nitrogen atom containing a replaceable hydrogen atom, in order that the reaction between the polyamide, the alkyl hydroxyaromatic compound and aldehyde will proceed.

To prepare the oil soluble condensation products of the invention, the polyamides formed by the process described above, are reacted with from 1–20 moles each of an aldehyde and an alkylated hydroxyaromatic compound, e.g. an alkyl phenol, in a Mannich synthesis at a temperature of between 25 and 250° C. in the presence or absence of solvent. In a preferred method the polyamide is reacted with from 1–4 moles each of an aliphatic aldehyde and a $C_{1-20}$ alkyl phenol at between 25 and 200° C.

Iso-fatty acids suitable for forming the polyamide reactant (1) are generally defined as those acids having a branched saturated or unsaturated aliphatic chain attached to the carboxyl group and having a total of from 8 to 22 carbon atoms. Examples of such acids include iso-palmitic, iso-stearic, iso-oleic, dimerized and trimerized unsaturated acids such as dimerized oleic and linoleic acids and the like. The term iso-fatty acid is further defined as also including mixtures of the aforementioned iso-fatty acids with straight chain acids having from about 12 to 20 carbon atoms. Such straight chain fatty acids include lauric, myristic, palmitic and/or stearic acid.

When mixtures of iso-fatty (branched chain) acids and straight chain fatty acids are employed, the iso-fatty acids normally comprise 70 to 95 mole percent of the mixture while the straight chain fatty acids will comprise 5 to 30 mole percent.

Polyalkylene polyamines which can be effectively reacted with the above-described iso-fatty acids include those conforming for the most part to the formula

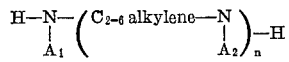

wherein $n$ is an integer of from 1 to 10, preferably 1–5, and $A_1$ and $A_2$ are hydrogen, $C_{1-18}$ alkyl, or amino $C_{1-18}$ alkyl. Within the scope of the invention are diethylene triamine, triethylene tetramine, tetraethylene pentamine, tripropylene tetramine, tetrapropylene pentamine, 2-aminoethyl piperazine, dimethylamino propylene diamine and the like. Other suitable polyamines are the result of polymerizing ethylene imine to a molecular weight of from 500 to 40,000. Preferred polyalkylene polyamines are the polyethylene polyamines, of which diethylene triamine and tetraethylene pentamine are particularly advantageous.

As previously mentioned the polyamide reactant (1) formed by the reaction a polyalkene polyamine with an iso-fatty acid must have an amino group with at least one replaceable hydrogen atom.

Therefore, it is necessary that the polyamine prior to reaction with the iso-fatty acid compound have amino groups with at least two replaceable hydrogen atoms, i.e., a minimum of one for reacting the iso-fatty acid forming the polyamide, and a remaining replaceable hydrogen in the polyamide for forming the polyamide-alkyl phenol-aldehyde reaction product.

By reacting the iso-fatty acids and polyalkylene polyamines hereinbefore described, a variety of suitable polyamides can be prepared. A particularly efficacious class of polyamides are the diamides which can be prepared by reacting one mole of polyalkylene polyamine with two moles of iso-fatty acid or with mixtures of iso-fatty and straight chain acids at between 120° C. and 250° C. for a period of 1–10 hours preferably under atmospheric pressure. The following examples is illustrative of the process for diamide formation.

1 mole of alkyl substituted diethylene triamine

and two moles of iso-oleic acid were mixed and heated at 175–200° C. for about 1–10 hours in an enclosed vessel under which the reaction was cooled. The diamide formed has the following formula: (Ia)

where R is oleyl radical. Other diamides which were prepared employing this procedure include (Ib) dioleylamide of diethylene triamine, (Ic) dimerized oleylamide of diethylene triamine, (Id) dimerized linoleylamide of diethylene triamine, (Ie) mixed di- and trimerized oleylamide of diethylene triamine, (If) diisooleylamide of diethylene triamine, (Ig) diisooleylamide of N-2-aminoethyl piperazine, (In) diamide of tetraethylene pentamine and isostearic acid, (Ij) diamide of tetraethylene pentamine and a mixture of 10 mole percent stearic acid and 90 mole percent iso-stearic acid.

The aldehydes useful in forming reaction products of this invention include $C_{1-4}$ aliphatic aldehydes, e.g., formaldehyde(paraformaldehyde) acetaldehyde, butyraldehyde; aromatic aldehydes, e.g., benzaldehyde or salicylaldehyde; and heterocyclic aldehydes, e.g., furfural. Mixtures of any of the aforementioned aldehydes, e.g. formaldehyde with acetaldehyde, may also be employed.

Suitable alkylated hydroxyaromatic compounds include $C_{1-20}$ alkyl mono and polyhydroxy aromatics such as $C_{4-18}$ alkyl phenol, naphthol, anthranol and the like. $C_{8-18}$ alkyl phenols such as nonyl phenol, dodecyl phenol, dinonyl phenol, and mixtures thereof form particularly advantageous reaction products.

The following examples illustrate the present invention.

EXAMPLE I

One mole of diamide identified above as (Ij) was reacted with 2 moles each of formaldehyde and dodecyl phenol at around 50–160° C. for about 5 hours. The final product was oil-soluble and possessed excellent detergent and sludge inhibiting properties.

EXAMPLE II

Diisostearamide of tetraethylene pentamine was reacted with 2.5 moles each of formaldehyde and dodecylphenol under reaction conditions of Example I and the final reaction product was oil-soluble and exhibited excellent detergent and corrosion inhibiting properties.

The following examples prepared under similar conditions as described for Examples I and II are also illustrative examples of the present invention:

EXAMPLE III reaction product of 1 mole diamide (Ia)-2 moles formaldehyde-2 moles decylphenol.

EXAMPLE IV reaction product of 1 mole of diamide (Ic)-1 mole formaldehyde-1 mole dodecylphenol.

EXAMPLE V reaction product of 1 mole of diamide (Ij)-3 moles formaldehyde-3-moles dodecylphenol.

EXAMPLE VI reaction product of 1 mole of diamide (Ij)-3-moles formaldehyde-3 moles $C_{14-18}$ alkylphenol.

EXAMPLE VII reaction product of 1 mole of (Ih)-2 moles of formaldehyde-2 moles dodecylphenol.

EXAMPLE VIII reaction product of 1 mole of (Ih)-2 moles of formaldye-2 moles benzylphenol.

EXAMPLE IX reaction product of 1 mole of (Ih)-2 moles of acetaldehyde-2 moles $C_{14-18}$ alkylphenol.

EXAMPLE X reaction product of 1 mole of diamide (Ic)-1 mole of formaldehyde-1 mole $C_{8}$-$C_{18}$ alkyl naphthol.

Reaction products of the present invention can be added in small amounts of from 0.1% to about 20%, preferably from 1% to 15% in various lubricants of the natural and/or synthetic type such as mineral lubricating oils in the viscosity range of from SAE 5W to SAE 140, preferably in the SAE viscosity range of 20–90. The mineral lubricating oils can be of the same base stock or blends of mineral lubricating oil and synthetic lubricants such as polymerized olefins, organic esters or organic and inorganic acids, e.g., di-2-ethylhexyl sebacate, pentaerythritol esters of mixed $C_{3-8}$ fatty acids, polyalkyl silicone polymers, e.g., dimethyl silicone polymer, and the like. If desired, the synthetic lubricants may be used as the sole base lubricant.

Mineral lubricating oils which are particularly desirable for use in compositions of this invention were obtained from West Texas Ellenburger crudes, East Texas crudes, Oklahoma crudes, California crudes. A useful refined oil therefrom has the following properties:

| | |
|---|---|
| Gravity, ° API | Min. 26.5. |
| Pour point, ° F. | Max. 10. |
| Flash, COC, ° F. | Min. 390. |
| Viscosity, SUS at 100° F. | 120–160. |
| Viscosity index | Min. 95. |

Another such oil is a SAE 30 mineral oil having the following properties:

| | |
|---|---|
| Gravity, ° API | Min. 24.5. |
| Pour point, ° F. | Max. −5. |
| Flash, COC, ° F. | Min. 415. |
| Viscosity, SUS at 210° F. | 58–63. |
| Viscosity index | 50–60. |

The reaction products of the present invention are useful additives in motor oils, diesel oils, various industrial oils such as hydraulic fluids, gear oils, cutting fluids and the like, also in gasolines, and are particularly useful in lubricants for 2-stroke engines. Two-stroke engine lubricants containing the reaction product of the present invention can be used in 2-stroke engines operating on neat or leaded gasolines. When leaded gasolines are used the presence of a halogen scavenger is normally desirable although not necessary. Thus, when leaded gasoline is used the lead compounds can be tetramethyl, tetraethyl, ethylmethyl, diethyl dimethyl, triethyl methyl lead and mixtures thereof. The scavengers include saturated and unsaturated halogenated (Cl, Br, I) olefins such as ethylene dibromine, ethylene dichloride or mixtures thereof. Still other scavengers include organic halide wherein the halogen atom is attached directly to an unsaturated carbon atom; there are mentioned haloethylenes, e.g., iodoethylene, 1,1-dichloroethylene, 1,2-dichloroethylene, 1,2-dichloroethylene, 1,2-dibromoethylene, trichloroethylene, tetrachloroethylene; halogen derivatives of butadiene, e.g., 1-chloro-1,3-butadiene, 2-chloro-1,3-butadiene, 1,1,2,3,4,4-hexachlorobutadiene, aryl halides, e.g., chlorobenzene, bromobenzene, dichlorobenzene, dibromobenzene, diiodobenzene, trichlorobenzene, tribromobenzene, tetrachlorobenzene, tetrafluorobenzene, hexafluorobenzene, halogen derivatives of unsaturated heterocyclic compounds, e.g., 2-chloropyridine, 3-chloropyridine, 4-chloropyridine, 3-bromopyridine, 3-chloropyrrole, 2-chlorothiophene and certain substituted haloacetylenes, e.g., 1-chlorohexyne-1, although halogen derivatives of the acetylenes are in general unlikely to be suitable. Preferred halides are those which contain the greatest amount of halogen per unit weight of halide consistent with adequate oil solubility. The fuel can also contain organic phosphites, phosphates, e.g., tricresyl phosphate, diphenyl cresyl phosphate, or boron esters and the like.

An excellent lubricant base for use in 2-stroke engines containing the reaction product of the present invention is an oil blend consisting of a mixture of from 10% to 50% Bright Stock and from 90% to 50% of a high viscosity index (80–140 VI) mineral lubricating oil having a viscosity at 100° F. SUS of from 100 to 600. A portion of the high viscosity oil can be replaced with a medium viscosity oil.

An oil base mixture for 2-stroke engines consists of (a) a Bright Stock fraction rich in aromatics (5–70%) and which has a viscosity index of at least 80, preferably between 90 and 110 and is obtained during the refining of mineral oils from the short residue after the distillate fractions have been removed. The short residue is dewaxed and deasphalted and if desired, solvent and clay-treated. The raffinate which remains after this treatment is called Bright Stock. Table I and II illustrate examples of useful Bright Stocks.

TABLE I.—EXAMPLES OF TYPICAL BRIGHT STOCKS

|  | Mid-continent bright stock | | Pennsylvania bright stock |
| --- | --- | --- | --- |
|  | Mild extraction | Heavy extraction |  |
| Viscosity, SUS, 100° F | 2,569 | 2,049 | 2,109 |
| Viscosity, SUS, 210° F | 141 | 131 | 144 |
| Viscosity index | 85 | 93 | 102 |
| Ring analysis: |  |  |  |
| Aromatic | 9 | 5 | 5 |
| Naphthenes | 19 | 19 | 16 |
| Paraffins | 72 | 76 | 79 |
| Ratio of paraffins to naphthenes | 3.8 | 3.62 | 4.95 |
| Average mol weight | 685 | 675 | 730 |
| Average rings per mol | 3.4 | 2.9 | 3.0 |

TABLE II.—SPECIFICATIONS FOR TYPICAL MID-CONTINENT BRIGHT STOCKS

|  | Unfiltered | | Filtered |
| --- | --- | --- | --- |
| Gravity, ° API, minimum | 25.5 | 24.5 | 25.5 |
| Color, NPA | 8+ | (¹) | 6.7 |
| Pour point, ° F, maximum | 10 | 10 | 10 |
| Flash, ° F, minimum | 540 | 580 | 545 |
| Fire, ° F., minimum | 6.5 | 655 | 610 |
| Viscosity, SUS, 210° F | 150-170 | 200-215 | 150-160 |
| Viscosity index, minimum | 90 | 90 | 90 |

¹ Dark green.

The other portion of the oil blend is a high viscosity index lubricating oil distillate fraction and specifically is a refined distillate fraction having a viscosity index of at least 80, preferably 90–110, an SUS viscosity of heterocyclic aromatics such as sulfur-containing aromatics (2–10%) such as benzothiophenes, dibenzothiophenes, thiophenacenaphthylenes, thiophenopenanthrenes, thiopenopyrines, etc. Such a typical petroleum fraction will be referred to as fraction (Y) and such a fraction derived from an East Texas crude has the following properties:

Viscosity, SUS, at 100° F. _____ 250
Viscosity index _____ 90–95

Analysis (incremental ultraviolet absorption)

Percent
Monoaromatics _____ 14
Polyaromatics, of which 13–17% are diaromatics containing thiophenic structures, e.g., benzo- and dibenzothiophenes _____ 21
Polar-containing resins _____ 3

Essentially balance-saturates

Base blends which are particularly preferred are:

(A) Percent
Bright Stock (unfiltered—Table II) _____ 10
HVI oil fraction (Y) _____ 90

(B)
Bright Stock (12% aromatics) _____ 50
HVI oil fraction (Y) _____ 50

(C)
Bright Stock _____ 10
MVI neutral oil _____ 10–30
Balance MVI neutral oil

Any of the oil bases may also contain fortifying agents such as viscosity index improvers, (e.g., polymeric acrylic esters), pour point depressants (e.g., methacrylate polymers), oxidation inhibitors, e.g., bis(2,6-di-t-butyl-4-hydroxy phenyl) methal deactivators, e.g., di-salicylal ethylene diimine, rust inhibitors, e.g., the condensation product of maleic anhydride and long-chain alkenes, anti-foaming agents e.g., silicone polymers, EP additives, provided that such EP additives do not contain halogens, e.g., triphenyl phosphate, and anti-seizure agents, e.g., acidless tallow or a non-drying fattay oil, e.g., castor oil. The term "gasoline" as used in 2-stroke engines is intended to mean a hydrocarbon oil, or a mixture of a hydrocarbon oil with an alcohol, distilling substantially continuously at atmospheric pressure throughout the temperature range 10° C. to 250° C. and containing a lead tetraalkyl, for example, tetraethyl lead, tetramethyl lead, ethyl triethyl lead, diethyldimethyl lead, triethyl methyl lead or mixtures thereof. The hydrocarbon oil will normally be derived from petroleum but may be derived from other sources, e.g., from coal or from synthetic processes. The gasoline may contain other anti-knock agents, for example, methyl cyclopentadienyl manganese tricarbonyl, and any of the additives of fortifying agents known to the art, e.g., vapor pressure modifiers such as butanes, co-anti-knock agents, e.g., tertiary butyl acetate, scavengers, e.g., alkyl halides, deposit modifiers, e.g., tritolyl phosphate, anti-icing additives, e.g., isopropyl alcohol, anti-foaming agents, e.g., silicones, anti-oxidants, e.g., 2,4-methyl-6-tertiary butyl phenol or di sec.butyl para phenylene diamine and dyestuffs or coloring agents.

The reaction product of the present invention can be used in amounts of from 0.1% to 10% in conventional motor lubricants such as used in 4-stroke engines, or in gear lubricants and the like. When this reaction product is used as a lubricant for 2-stroke engines the additive is used in higher concentrations of from 1% to 25%, preferably from 3% to 10%. The compounded lubricant is blended with a suitable fuel, e.g., gasoline, diesel fuel, etc., in amounts of from about 0.2 to about 10 pints, preferably 1–5 pints of lubricant per gallon of fuel, e.g., neat or leaded gasoline or the lubricant of the present invention can be used in the ratio of 1 part of oil compositions to 5–100 parts of fuel. Generally, 1 part of the oil composition to 10 to 50 parts of fuel is preferred.

The following examples illustrate lubricating oil compositions of the present invention:

Composition I

Example I reaction product _____percent wt__ 5
SAE 30 mineral lubricating oil _____ Balance Composition II Example II reaction product ____percent wt__ 7
SAE 40 mineral lubricating oil _____ Balance Composition III Percent wt.
Example V reaction product _____ 5
1,1 - bis(3,5 - ditert butyl - 4 - hydroxyphenyl) methane _____ 0.5
SAE 30 mineral lubricating oil _____ Balance Composition IV Percent
Example VI reaction product _____ 5
1,1 - bis(3,5 - ditert butyl - 4 - hydroxyphenyl) methane _____ 0.5
Tricresyl phosphate _____ 0.8
10W-30 mineral lubricating oil _____ Balance

Composition V

Example VII reaction product ____percent wt__ 5
Base blend (A) ---------------------- Balance

Composition VI

Example V reaction product ____percent wt__ 5
Base blend (A) ---------------------- Balance

Composition VII

Example VI reaction product ____percent wt__ 10
Base blend (A) ---------------------- Balance The lubricating oil compositions were tested as 2-stroke engine lubricants in Homelite motor-generators, and in Mercury 650 and Johnson 40 HP. outboard 2-stroke engines under conditions shown below.

Homelite engine test conditions

Test conditions and duration: Full power for 15 hours.
Test fuel: Shell gasoline leaded to 3 ml./gal. motor mix TEL and containing 0.2 theory phosphorus as diphenyl cresyl phosphate.
Fuel/oil ratio: 15/1.
Base oil: Blend A.

Mercury 650 outboard engine test conditions

Test conditions and duration: 100 hours alternate periods of 5 minutes idle and 55 minutes full-throttle at 5000 r.p.m.
Test fuel: Shell gasoline leaded to 3 ml./gal. motor mix TEL and containing 0.2 theory phosphorus as diphenyl cresyl phosphate.
Fuel/oil ratio: 20/1.
Base oil: Blend C.

Johnson 40 HP. outboard engine test conditions

Test conditions and durations: 98-hour test alternate 5 minutes idle, 55 minutes full throttle, 4800 r.p.m. with one hour shutdown after each 7 running hours.
Test fuel: Shell gasoline leaded to 3 ml./gal. motor mix TEL and containing 0.2 theory phosphorus as diphenyl cresyl phosphate.
Fuel/oil ratio: 50/1.
Base oil: Blend C.

Compositions V, VI and VII tested in the above three engines under conditions described gave excellent results, with essentially no ring sticking (28–29 rating where 30 is perfect); no piston skirt lacquer deposits (7–10 where 10 is perfect); no exhaust port blockage (9.4–10 where 10 is perfect); combustion chamber deposit (7.5–8.2 where 10 is perfect) and piston scuffing (8.5–9.5 where 10 is perfect). Compositions X and Y containing 5% each of additive (Ih) and (Ij) when tested in the Homelite engine under similar test conditions described above resulted in reduction of engine cleanliness rating of from about 3% to 15% when compared to results obtained with Compositions V, VI and VII as noted above.

Examples V, VI and VII reaction products and intermediate compounds (Ih) and (Ij) were subjected to differential thermal analysis and it was found that the reaction products of Examples V, VI and VII begin thermal decomposition in the presence of air, about 100° F. higher than the compounds (Ih) and (Ij) indicating that the decomposition rate of (Ih) and (Ij) is much greater than that of Examples V, VI and VII reaction products of the present invention.

This is clear evidence that the reaction products of the present invention are much more stable than the intermediate compounds (Ih) and (Ij).

Condensation products of the present invention can be used also in gear lubricants, in truck, railroad and automotive lubricants, in hydraulic fluids, greases, diesel fuels and in gasolines.

We claim as our invention:

1. An oil-soluble reaction product prepared by reacting at 25–250° C. (1) 1 mole of a diamide of tetraethylenepentamine and isostearic acid with (2) from 1–4 moles each per mole of diamide of dodecylphenol and formaldehyde; said dodecylphenol and formaldehyde being present in equimolar ratios; said diamide being formed by reacting at 100–250° C. 2 moles of isostearic acid with 1 mole of tetraethylenepentamine.

2. The reaction product of claim 1 wherein the diamide is the product of tetraethylenepentamine and a mixture of isostearic acid and stearic acid.

References Cited

UNITED STATES PATENTS

| | | | |
|---|---|---|---|
| Re. 26,330 | 2/1966 | Colfer | 260—404 |
| 2,430,860 | 11/1947 | Cairns | 260—72 |
| 3,141,787 | 7/1964 | Geotze et al. | 260—404.5 |
| 3,216,936 | 11/1965 | Le Suer | 260—404.5 |
| 3,280,097 | 10/1966 | Cizek | 260—404.5 |
| 3,298,955 | 1/1967 | Strang | 260—404.5 |
| 3,326,801 | 6/1967 | Schlobohm et al. | 260—404.5 |
| 3,373,111 | 3/1968 | Le Suer et al. | 260—404 |

OTHER REFERENCES

Blicke, "The Mannich Reaction" (1954), New York, John Wiley & Sons, pp. 303–04, QD 251 07.

Dow Chem. "Preparation of Cationic Carbamoyl Polymers" (1967), CA 67, No. 82563f (1967).

ELBERT L. ROBERTS, Primary Examiner

G. HOLLRAH, Assistant Examiner

U.S. Cl. X.R.

260—268 C, 347.3